Figure 1:
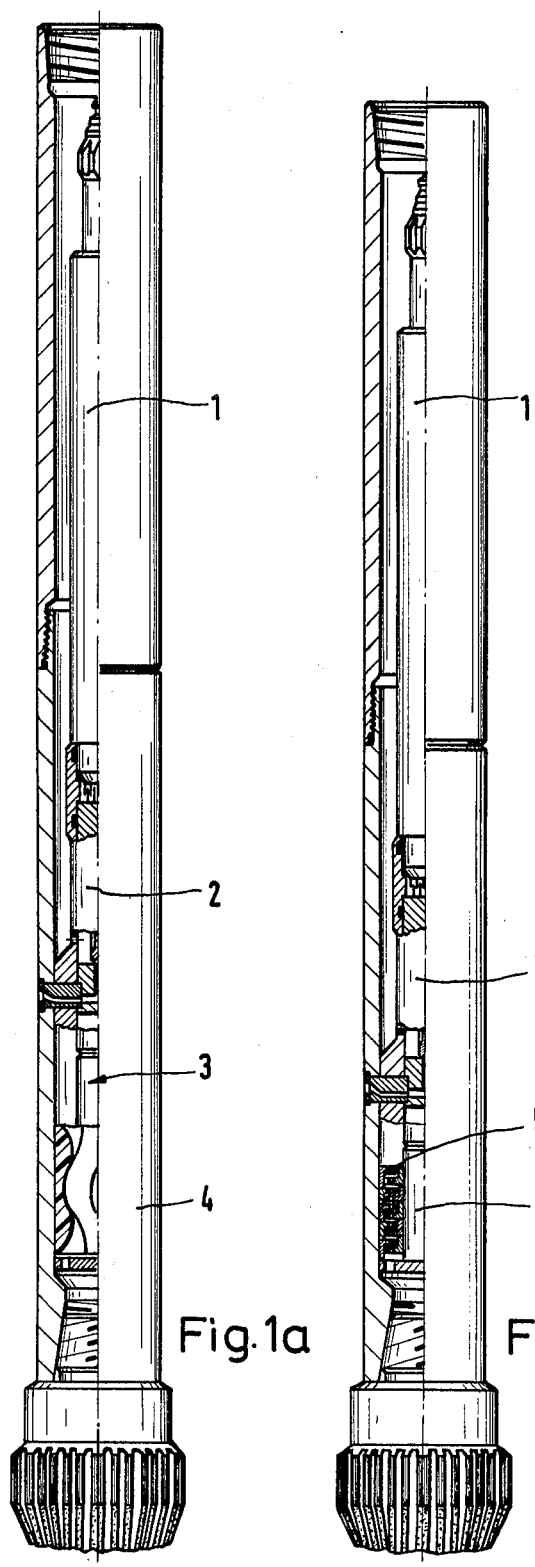

United States Patent [19]

Jürgens

[11] 4,415,823

[45] Nov. 15, 1983

[54] GENERATOR FOR THE PRODUCTION OF ELECTRICAL ENERGY

[75] Inventor: Rainer Jürgens, Altencelle, Fed. Rep. of Germany

[73] Assignee: Christensen, Inc., Salt Lake City, Utah

[21] Appl. No.: 289,683

[22] Filed: Aug. 3, 1981

[30] Foreign Application Priority Data

Aug. 4, 1980 [DE] Fed. Rep. of Germany ....... 3029523

[51] Int. Cl.$^3$ ............................................. H02K 5/10
[52] U.S. Cl. ....................................... 310/87; 310/90; 310/112
[58] Field of Search ..................... 310/87, 112, 58–64, 310/90

[56] References Cited

U.S. PATENT DOCUMENTS

| | | | |
|---|---|---|---|
| 2,940,177 | 6/1960 | Bricaud | 33/205.5 |
| 3,209,156 | 9/1965 | Strubb, Jr. | 310/87 X |
| 3,242,360 | 3/1966 | Carle | 310/87 |
| 3,267,868 | 8/1966 | Page | 310/87 X |
| 4,352,037 | 9/1982 | Santner | 310/87 X |
| 4,382,199 | 5/1983 | Isaacson | 310/87 |

Primary Examiner—Donovan F. Duggan
Attorney, Agent, or Firm—Rufus M. Franklin

[57] ABSTRACT

Generator for production of electrical energy to supply consumers located inside a bore hole, in particular, consumers for detection, transmission and remote control, where the generator is located in a flushing space inside of a drill string through which flushing liquid flows, which includes a stator and a rotor having a radial slot arranged coaxially to the stator and whose rotor is coupled to a motor which is energized by the flushing liquid, characterized by the fact that the stator contains a generator armature and the rotor contains an exciter equipped with a permanent magnet, that said slot between stator and rotor is connected with said flushing space, where a connecting path is directed counter-current to or at an acute angle to the flushing current on the intake side in the region of a branch-off from said flushing space, and that the rotor is supported by means of unsealed, erosion and abrasion-resistant radial and axial bearings.

9 Claims, 3 Drawing Figures

GENERATOR FOR THE PRODUCTION OF ELECTRICAL ENERGY

The invention is concerned with a generator for the production of electrical energy to supply users located inside a bore hole, in particular, installations for detection, transmission and remote control of measured data where the generator is located in a flushing space inside a bore bed through which a flushing liquid flows, and which includes a stator and a rotor having a radial slot and arranged coaxially to the stator and whose rotor is coupled to a motor which is energized by the flushing liquid.

Installations for detection, transmission and remote control of measured data inside a bore hole serve to give information about the position of the boring tool and other characteristic magnitudes rapidly as well as to influence the bore direction and thereby facilitate reliable boring to a fixed objective, e.g., a presumed deposit.

Since, particularly in the case of installations for transmission and remote control, mechanical parts are controlled elecro-magnetically or servoassisted motions are initiated, a relatively high electrical energy is required, which cannot be produced efficiently by primary or secondary cells alone. Installations for data measuring and transmission already installed in the field are equipped with a generator, which is coupled to a motor driven by the flushing liquid to provide this energy. While the mechanical drive output required for all anticipated applications of the given bore hole measurements can be produced easily by known flushing motors, elecrical machines of adequate required electrical performance which have conventional dimensions and are of encapsulated construction cannot be applied due to their radial size. To approach the optimal construction of the dimensions of the electrically active parts with respect to a fixed required performance, encapsulation must be dispensed with. In view of the environmental conditions which are present on the inside of the drill string, the assignment underlying the invention consists of permitting operation in abrasive and high pressure flushing conditions for the production of electrical energy for the supply of users located inside a bore hole by particular constructional measures and to offer an uncomplicated assembly and disassembly of the individual parts.

This assignment is solved with a generator of the above-named kind, in that the stator contains a generator armature and the rotor contains an exciter equipped with a permanent magnet, in that the clearance between stator and rotor is connected to the inner flushing space, where the connecting path is directed on the intake side partly countercurrent or at an acute angle to the flushing flow, and in that the rotor is supported by means of unsealed erosion and abrasion-resistant radial and axial bearings.

The arrangement of the generator armature in the stator permits a direct connection from the winding to the connected users which avoids the need for sliprings or brushes. Abrasion phenomena and short circuits by ionic conduction of the flushing liquid are, thereby, avoided. Furthermore, a simple assembly and reassembly is possible after maintenance work since no precision adjustments must be conducted. The space between stator and rotor is connected with the inner flushing space by means of a connecting path, so that infiltrating flushing liquid can circulate and sedimentation of particles suspended in the flush and the erosion phenomena which result from this are avoided. The connecting path located on the intake side, where the intake side refers to the direction of flow of the flushing liquid, is conducted partly countercurrently or at an angle to the flow direction on the region of the turnoff from the flushing space, so that the particles suspended in the flush are, to a large extent, stopped from intruding into the connecting path because of their inertia.

The use of unsealed and erosion and abrasion-resistant radial and axial bearings results in a longer lifetime of the bearing surfaces. Lubrication is achieved by means of the flushing liquid. In contrast to sealed, lubricant-filled bearings which are very susceptible to intruded flush at high flush liquid pressure and then fail completely in a short time, the unsealed abrasion-resistant bearing shows a certain lifetime of several hundreds of operating hours and, in addition, permit simple assembly and disassembly of generator stator and rotor.

For the protection of the armature from scouring by the flush which is located in the clearance and which is caused to rotate by the rotation of the rotor, the surface of the armature is coated with a thin, abrasion-resistant protective coating. To prevent wedging of flush-suspended particles of the magnitude of the clearance width at the first intrusion of flush into the clearance between the rotor and stator and the consequent involvement of the protective coating, the radial clearance width of the connecting path is smaller than the smallest clearance width between rotor and stator. The connecting path can also be chosen to be longer and constructed as a kind of labyrinth packing.

Among especially simple fixing elements for the generator bearings, a version emerges by which the radial bearings of the rotor support it against the outside pipe. Thus, the rotor bearing shells are supported on the intake side against a collar of the rotor, while, on the same side, the stator bearing shells lie near a collar of the exterior tube by way of a spacer sleeve. Spacers, which, for example, can be formed as the rotor and stator blades of a turbine, are located between the bearing on the intake side and the bearing on the outlet side. The bearing on the outlet side is fixed to an additional exterior tubing piece and additional spacer by means of a threaded sleeve on the side of the rotor shell and by means of a threaded lug on the stator shell side.

The bearing shells are preferentially made from cemented carbide. The advantage of such an arrangement is that the individual parts used take over several functions such as the mutual axial fixing of bearings and turbine blades and rotational locking or torque transmission by means of frictional resistance.

Due to the strong axial forces exerted on the generator rotor, this has, preferentially, a diamond bearing as an axial bearings which is distinguished by a particularly small wear even at a high load. This bearing is fixed with its intake-side bearing shell to the above-mentioned threaded sleeve, which serves to fix the rotor bearing shell, and with its outlet side bearing to a spider-shaped insert, which serves, in addition, on the outside, as a spacer to fix the stator radial bearing shell and on the inside, to house the armature shaft. The armature shaft of the stator, on the other hand, has an outside threaded lug on the intake side and is threaded into an insert on the intake side. In this case, as well, the installation is used to solve several problems at the same time, which facilitates assembly and limits the number of individual parts to a small number.

Further characteristics and advantages of the invention are shown in the claims and the following description in connection with the drawing, in which a construction example of the subject of the invention is illustrated. In the drawing are shown:

FIG. 1a, b Longitudinal section through a drill string to illustrate the location of generator, transmission and measured data detection unit and choice of several types of drive.

Figure 2:
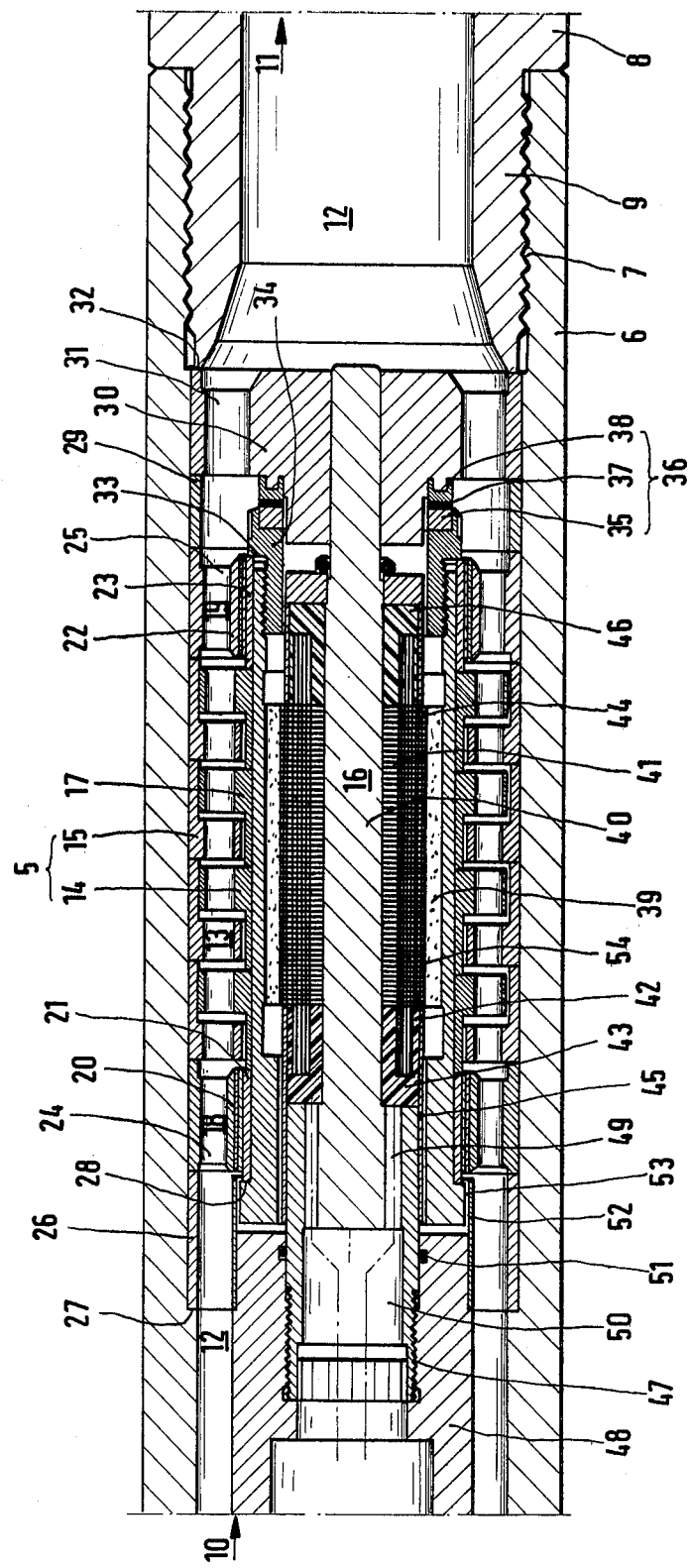

FIG. 2 A longitudinal section through a generator.

In FIG. 1a, the lower part of a drill string is shown which has a device for data detection and transmission located over the tool.

This device encompasses a sensor and data processing unit 1, a transmission unit 2, a generator 3 and a drive motor 4, which is constructed as a displacement motor according to the Moineau principle.

FIG. 1 is different from FIG. 1a, only by the different drive of the generator 3 which is here fitted out with a turbine 5 set upon on the generator.

FIG. 2 shows a longitudinal section through the turbine driven generaor 3 represented in FIG. 1b. The generator is located inside a drill string which the flushing liquid streams through. The drill string consists of an outer tube 6 with an inside thread 7 to which an additional tubing piece 8 with an outside threaded lug 9 is connected.

Flushing liquid is pumped downward inside the outer tube 6 to the bore tool, flows out there through nozzles or outlets, and returns through an annulus between outer tube and bore hole wall to the surface of the earth. The flow direction inside the bore bed runs from the intake side 10 to the outlet side 11. The interior space filled with flushing liquid is designated as flushing space 12. A portion of the flushing space forms a turbine space 13 in which the rotor blades 14 and the stator blades 15 of a multistage turbine 5 are arranged, which serves as drive motor for a permanent magnet excited three-phase generator, the whole being designated as 16. The exterior rings of the stator blades 15 lie adjacent to the interior wall of the exterior tube 6, while the rotor blades 14 enclose a cylindrical rotor piece 17. Cemented carbide radial bearings 18;19, which support the cylindrical rotor piece 17 against the exterior pipe 6, are arranged on both sides of the turbine 5. The cemented carbide radial bearings consist, at times, of a stator bearing shell 20;22 which have axially directed openings 24;25 for the flushing liquid, and, at times, of a rotor bearing shell 21;23. The rubbing surfaces are, at times, provided with a cemented carbide coating 25. On the intake side, the arrangement made by the bearings and turbine stages is fixed onto a shoulder 27 of the exterior tube 6 via a spacer sleeve 28 or directly onto a shoulder 28 of the rotor piece 17. On the outlet side, the array is braced against a shoulder 32 of the outside threaded lug 9 or against a shoulder 33 of a threaded sleeve 34 by way of a spacer sleeve 29 and an inner piece 30, which has axially directed openings 31 for the flushing liquid. On the outlet side, the threaded sleeve 34 is screwed into the cylindrical rotor piece 17. Furthermore, the intake side rotor bearing shell 35 of a diamond axial bearing 36 is embedded into the threaded sleeve 34. The counterpart of rotor bearing shell 35, the outlet side stator bearing shell 38, is connected to the inner piece 30. The diamond bearing has a coating 37 of diamond impregnated in a binder on the rubbing surfaces of both bearing shells. The generator 16 is arranged coaxial to the turbine 5. The generator 16, consists of an exciter, which is formed out of the cylindrical rotor piece 17 and the permanent magnets 39 fastened to it, and out of a stationary armature, which for its part, essentially comprises a shaft 40, a packet of transformer steel 41 mounted on it and a winding 42. As an additional constructional characteristic, the winding is sealed with sealing compound 43 and provided with an abrasion-resistant rubber protective coating 44. In continuation of this coating a sleeve 45 is pushed onto the intake side and an additional sleeve 46 pushed onto the outlet side, where the outlet side sleeve is formed as a one-sided open pot. On the outlet side, the shaft 40 is supported in a drilled hole of the inner piece 30, while on the intake side, it rests in an additional sleeve with an exterior thread lug 47, which, for its part, is screwed into a threaded hole of an insert 48. On the intake side, the shaft 40 has three bored holes 49 which are distributed over the circumference and which run axially, in which the cables which lead from the armature winding 42 to the users are placed.

An interior space 50 of the wider sleeve 47 is hollow and is sealed against the flushing pressure by means of a packing 51. A sleeve 52 is thrust on this outside surface of the insert 48. The sleeve 48, for its part, projects axially over a projecting surface of the cylindrical rotor piece 17 and defines a connecting path 53, directed countercurrent to the flushing current between the flushing space 12 and the clearance between rotor and stator, also designated as slit 54.

Using the above-described construction, the assembly results from screwing the completely preassembled armature into the insert 48 and the connected insertion of the spacer sleeve 26 and the complete preassembled armature into the insert 48 and the connected insertion of the spacer sleeve 26 and the complete preassembled set from the cylindrical rotor piece 17, the rotor bearing shells 21;23, rotor turbine blades 14 as well as the stator bearing shells 20;22 and stator turbine blades 15 which are set on and between them. Parts which belong to the rotor are braced by frictional resistance by means of the threaded sleeve 34; the connecting spacer ring 29 and the inner piece 30 is slid into the outer tube 6, whereby the inner piece 30 receives the shaft 40. The parts belonging to the rotor are frictionally fitted against the exterior tube 6 by screwing the threaded lug 9 into the inside thread 30 of the exterior tube 6.

During boring operation, flushing liquid flows through the flushing space 12 and consequently also through the turbine space 13 and moves the turbine with the generator rotor coupled to it into rotation. Thereby the rotating permanent magnets produce a three-phase current in the stationary armature and induce a three-phase current in the armature winding which is formed as a three-phase winding.

What is claimed is:

1. Generator for production of electrical energy to supply consumers located inside a bore hole, in particular, consumers for detection, transmission and remote control, where the generator is located in a flushing space inside of a drill string through which flushing liquid flows, which includes a stator and a rotor having a radial space arranged coaxially to the stator said rotor being coupled to a motor which is energized by the flushing liquid, said stator containing a generator armature and said rotor containing an exciter equipped with permanent magnet means, characterized by the fact that said space between stator and rotor is connected with said flushing space, a connecting path is directed counter-current to the direction of the flushing current on the intake side, and that said rotor is supported by means of unsealed, erosion and abrasion-resistant radial and axial bearings.

2. Generator according to claim 1, characterized by the fact that adjacent said space, the generator armature is provided with an abrasion-resistant protective coating.

3. Generator according to one of the claims 1 or 2, characterized by the fact that the radial opening width of the connecting path is narrower than the smallest space width between rotor and stator.

4. Genarator according claim 3, characterized by the fact that the connecting path is constructed in the manner of a labyrinth.

5. Generator according to claim 4, characterized further by the fact that said radial bearing comprises roller bearings including rotary and fixed cages at the inlet and outlet sides of the generator, the intake side front side of the roller bearing cage of the intake side radial bearing borders on a shoulder of a rotor part and the fixed bearing cage of this bearing borders on a shoulder of the outer tube by way of a spacer sleeve, that spacers are located between the outlet side front side of the above-named radial bearing and the intake side front side of the outlet side radial bearing and that the outlet side front side of the rotor bearing shell of the outlet side radial bearing is fixed to the rotor piece by means of a projecting threaded sleeve, while the intake side front side of its stator bearing shell is fixed to another outer tube piece via spacers by means of the front side of a threaded lug.

6. Generator according to claim 5, characterized by the fact that the spacer bodies between the radial bearings are formed to be cascaded rotor and stator blade wheels of a drive motor for the generator constructed as turbine.

7. Generator according to one of the claim 5, characterized by the fact that the rubbing surfaces of the radial bearings have a cemented carbide coating.

8. Generator according to claim 5, characterized by the fact that the back side of the threaded sleeve carries the rotor bearing shell of the axial bearing, while the stator bearing shell is fastened onto an upper piece which serves as a spacer in fixing the radial bearings.

9. Generator according to claim 8, characterized by the fact that the axial bearing is fashioned as a diamond bearing.

* * * * *